(12) United States Patent
Zabel (10) Patent No.: US 11,520,165 B2
(45) Date of Patent: Dec. 6, 2022

(54) EYEGLASSES CLIP FOR SECURING EYEGLASSES TO A CAP IN A STOWED CONFIGURATION

(71) Applicant: David R. Zabel, Longmont, CO (US)

(72) Inventor: David R. Zabel, Longmont, CO (US)

( * ) Notice: Subject to any disclaimer, the term of this patent is extended or adjusted under 35 U.S.C. 154(b) by 0 days.

(21) Appl. No.: 16/997,490

(22) Filed: Aug. 19, 2020

(65) Prior Publication Data

US 2022/0057649 A1 Feb. 24, 2022

(51) Int. Cl.
*A42B 1/24* (2021.01)
*G02C 3/00* (2006.01)
*A44B 11/06* (2006.01)
*G02C 3/02* (2006.01)

(52) U.S. Cl.
CPC ............... *G02C 3/006* (2013.01); *A42B 1/24* (2013.01); *A44B 11/06* (2013.01); *G02C 3/02* (2013.01)

(58) Field of Classification Search
CPC ............ G02C 3/006; A42B 1/24; A44B 11/06
See application file for complete search history.

(56) References Cited

U.S. PATENT DOCUMENTS

| | | | |
|---|---|---|---|
| 264,574 A | 9/1882 | Shone | |
| 550,274 A * | 11/1895 | Johnson | A41D 25/00 24/570 |
| 857,838 A | 7/1906 | Shaw | |
| 836,458 A * | 11/1906 | Peters | A47G 21/165 24/8 |
| 889,969 A * | 6/1908 | Riossujck | A41F 11/02 24/561 |
| 1,618,384 A * | 2/1927 | Morris | A44B 9/00 24/570 |
| 1,648,408 A * | 11/1927 | Kumagai | B42F 15/066 D19/86 |
| 1,747,322 A * | 2/1930 | Riker | A43C 11/24 24/113 MP |
| 2,155,258 A * | 4/1939 | Dennis | A61F 9/025 2/11 |
| 2,614,305 A * | 10/1952 | Yeardley | A45F 5/022 24/3.12 |
| 2,717,385 A | 5/1953 | Linster | |
| 3,802,032 A * | 4/1974 | Weed | A44B 6/00 24/66.4 |
| 3,983,602 A * | 10/1976 | Barry | B43K 23/001 24/339 |

(Continued)

FOREIGN PATENT DOCUMENTS

WO WO2002046828 12/2000
WO WO2015020755 8/2013

*Primary Examiner* — Jason W San (57) ABSTRACT

An eyewear clipping device to fasten the eyewear to the sides of a cap that comprises a first vertical member forming an exterior slot for receiving an earpiece of an eyewear with a first top end and a first bottom end. A second vertical member forms an interior three-sectioned clip with a second top end and a bottom end comprising a central ascending vertical section that forks at the top second end to form two retention wings that extend back downward toward the bottom end that insert behind a hat band of a cap and together with the central ascending vertical section, which is positioned in front of the hat band, create an opposed gripping force on the hat band. The first bottom end and the second bottom end connect together using a U-shaped curve or straight bridge.

20 Claims, 11 Drawing Sheets

(56) References Cited

U.S. PATENT DOCUMENTS

| | | | |
|---|---|---|---|
| 4,179,753 A | 12/1979 | Aronberg | |
| 4,876,771 A * | 10/1989 | Givati | D06F 55/00 24/298 |
| 5,066,154 A * | 11/1991 | Renaud | A42B 3/04 24/3.12 |
| 5,102,024 A | 4/1992 | Boersma | |
| 5,188,318 A * | 2/1993 | Newcomer | H02G 3/24 248/68.1 |
| D389,636 S * | 1/1998 | Davis, Sr. | D2/894 |
| 5,829,103 A * | 11/1998 | Allen | B43K 23/001 24/3.12 |
| 5,867,874 A * | 2/1999 | Simpson | A42B 1/24 24/3.12 |
| 5,884,372 A * | 3/1999 | Anscher | F16L 3/13 24/339 |
| 6,019,335 A * | 2/2000 | Sehati | A45F 5/021 248/312 |
| 6,134,753 A | 10/2000 | O'Mahony | |
| 6,185,748 B1 | 2/2001 | DeChambeau | |
| 6,477,744 B1 * | 11/2002 | Miles | B43K 23/002 24/3.12 |
| 6,481,060 B1 * | 11/2002 | Tsai | A42B 1/24 24/336 |
| 6,647,554 B1 | 4/2003 | Ching | |
| 6,564,432 B1 | 5/2003 | Kushner | |
| 6,644,807 B1 | 11/2003 | Hood | |
| 6,694,526 B1 * | 2/2004 | Tate | A44C 1/00 24/3.12 |
| 6,742,224 B2 * | 6/2004 | Matityahu | H01R 13/465 24/336 |
| 6,792,619 B1 * | 9/2004 | Morris | A61F 9/029 2/10 |
| 6,802,665 B2 * | 10/2004 | Brown | B43K 23/06 401/48 |
| D503,430 S | 3/2005 | Chang | |
| 6,874,167 B1 * | 4/2005 | Leszczynski | A42B 1/24 2/209.13 |
| 6,962,315 B2 * | 11/2005 | Lee | B43L 3/00 248/316.1 |
| 7,003,809 B1 * | 2/2006 | Gordon | A42B 1/241 2/209.13 |
| 7,137,151 B2 * | 11/2006 | Keech | B43K 23/001 2/244 |
| 7,229,172 B2 | 6/2007 | Presswood | |
| 7,325,920 B1 | 2/2008 | Gelfuso | |
| 7,607,627 B1 * | 10/2009 | Mchatet | B60R 7/082 24/3.12 |
| 7,866,813 B2 | 1/2011 | Anhalt | |
| 7,979,920 B2 | 7/2011 | Gilman | |
| D668,436 S * | 10/2012 | Kelley | D2/895 |
| 8,381,359 B1 * | 2/2013 | McArdle | A45F 5/02 24/3.12 |
| 8,573,773 B1 | 5/2013 | Acosta | |
| 8,510,916 B2 * | 8/2013 | Kinvi | G09F 21/02 24/3.12 |
| 8,545,041 B2 * | 10/2013 | Brown | F21V 21/0885 24/336 |
| 8,696,112 B1 | 4/2014 | Vaught | |
| 8,740,379 B2 | 6/2014 | Berger | |
| D752,342 S * | 3/2016 | Woods | D3/219 |
| 9,316,847 B1 | 4/2016 | Kells | |
| 9,341,285 B2 * | 5/2016 | Magno, Jr. | H02G 3/32 |
| 10,070,697 B1 * | 9/2018 | Melgoza | A44C 3/001 |
| D854,406 S * | 7/2019 | Chen | D8/395 |
| 10,421,311 B2 * | 9/2019 | Mullen | A45F 5/02 |
| 10,455,880 B2 | 10/2019 | Livingston | |
| 10,699,603 B2 * | 6/2020 | Deco | G09F 3/06 |
| 10,959,508 B1 * | 3/2021 | Phillips | A45F 5/02 |
| 2002/0069488 A1 * | 6/2002 | Morris | G02C 3/02 24/3.12 |
| 2007/0220656 A1 | 9/2007 | Cotutsca | |
| 2011/0019147 A1 | 1/2011 | Ledford | |
| 2011/0113529 A1 * | 5/2011 | Milioto | A42B 3/04 24/3.12 |
| 2011/0219508 A1 | 9/2011 | Hill | |
| 2012/0272483 A1 | 11/2012 | Moore | |
| 2012/0324710 A1 * | 12/2012 | Panopoulos | A41F 1/00 24/499 |
| 2014/0250640 A1 * | 9/2014 | Crooks | A41F 19/00 24/303 |
| 2015/0216264 A1 * | 8/2015 | Kim | A43C 7/00 24/712.7 |
| 2018/0303230 A1 * | 10/2018 | Haas | F16B 2/24 |
| 2019/0001737 A1 * | 1/2019 | Mullen | B43K 23/001 |
| 2019/0320592 A1 * | 10/2019 | Schuttler | A01G 9/006 |

* cited by examiner

EYEGLASSES CLIP FOR SECURING EYEGLASSES TO A CAP IN A STOWED CONFIGURATION

CROSS REFERENCE TO RELATED APPLICATIONS

This application claims priority from provisional patent application 62/969,527, filed on Feb. 3, 2020, which is incorporated by reference herein.

FIELD OF INVENTION

The present invention relates to the field eyewear holders or clips, and, more particularly to a sunglass clip used to secure sunglasses to a cap or hat, more specifically to a baseball cap.

BACKGROUND

Individuals frequently wear sunglasses and baseball caps when engaging in many outdoor activities. The combination of baseball caps with sunglasses has been a familiar fixture of many outdoor activities for decades. Such activities include fishing, hunting, boating, 4-wheeling, beach outings, observing outside sporting events, driving, outdoor festivals, fairs, hiking, mountain climbing, and numerous other activities. Very often, participants in such events will move into and out of sunny environments, or the weather will be partly sunny with frequent periods of bright sun and cloudy.

When moving back and forth between bright sunshine and dim lighting such as entering/exiting a building or conditions changing from sunny to cloudy, individuals wearing caps/hats and sunglasses will stow the sunglasses. Often, the sunglasses will be repositioned over the crown of the cap/hat orientated forward or rearranged so as to be worn reversed orientated backwards. In recent years, it has become increasingly fashionable to reposition sunglasses in a rearward orientation essentially worn backwards.

Responsive to the need to keep sunglasses, or other eyewear, secured and out of the way in conjunction with caps/hats, various types of clips or holders. However, these various prior art clips and holders have fallen short. Some require operating the clip/holder to an open configuration to receive a portion of the sunglasses, generally the ear pieces or the nose bridge. Others fail to secure the eyeglasses to the clip/holder. Others tend to rotate about the brim of the cap/hat at the attachment point or do not securely attach the clip/holder to the brim.

Based on the foregoing, there is a need in the sunglasses clip/holder field of eyewear holders or clips to provide a simple design that does not require physical manipulation from a closed to open configuration to receive the eyewear, firmly secures the eyewear to the clip/holder, and firmly secures to the brim without a tendency to rotate. Additionally, there is a need for a clip/holder that can retain eyewear in either a forward or a reverse orientation.

SUMMARY

In an embodiment, a pair of plastic or other resilient polymer eyeglasses clip/holder can be attached to the hat band of a of a cap or hat. The clip/holder includes an open top S-curved body that extends vertically downward to make a sharp 180° turn to extend upward forming a clamp featuring two wings. The wings are inserted into the hat band of the cap or hat and together with a central portion forms an opposing clamp. The clamp formed with the two wings provides a stable attachment point.

Once attached to the hat, the clip/holder can receive the earpieces of a pair of eyeglasses. Most often, the eyeglasses will comprise a pair of sunglasses. The clip/holder securely grips the earpieces with a retention lip extending from inner walls of the clip/holder into the interior of the clip/holder. The eyeglasses can then be secured in a stowed configuration to the hat. While not limited to baseball caps, most typically that is the type of hat that will be paired with the eyeglasses holder disclosed herein.

A eyeglasses holder device for securing a pair of eyeglasses that comprises a resilient substantially flat eyeglasses holder body for attaching to a cap rim forming an opening into the cap. The eyeglasses holder includes a substantially flattened and roughly S-curved body with an outer portion of the S-curve forming an essentially vertical straight central portion extending upward from a sharp substantially 180 degree curve that transitions into a roughly straight vertical back clamp extending upward roughly parallel to vertical central portion. The vertical back clamp extending laterally into two wing retention prongs that extend to curve back toward the substantially 180 degree curve.

An eyewear clipping device to fasten the eyewear to the sides of a cap that comprises a first vertical member forming an exterior slot for receiving an earpiece of an eyewear with a first top end and a first bottom end. A second vertical member forms an interior three-sectioned clip with a second top end and a second bottom end comprising a central ascending vertical section that forks at the top second end to form two retention wings that extend back downward toward the second bottom end that insert behind a hat band of a cap and together with the central ascending vertical section, which is positioned in front of the hat band, create an opposed gripping force on the hat band. The first bottom end and the second bottom end connect together.

An eyewear holder device to fasten the eyewear to a cap, comprised of a bottom joint comprised of a first essentially vertical member extending upward from the joint forming an exterior slot for receiving an earpiece of an eyewear, which is positioned in front of a rim of a cap, and a second vertical member extending upward from the bottom joint forming an interior three-sectioned clip comprising a central ascending vertical section forking at a top end to form two retention wings that extend back downward toward the bottom joint to insert behind a hat band of a cap and together with the central ascending vertical section, which is positioned in front of the hat band, creating an opposed gripping force on the hat band. A retention lip extending inward from the first essentially vertical member to engage an earpiece of an inserted pair of eyeglasses. The bottom joint connects the first vertical member and the second vertical member together.

Advantages

1. Improved flexibility of use with ability to secure eyeglasses in various orientations including forward, backward, upside down, or downside down.
2. Improved securing of eyeglasses to the clip/holder.
3. A securing lip to improve retention of the eyeglasses.
4. Improved stability of the clip/holder attachment to a cap/hat.
5. Cheaper and easier to implement; no metal components.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-11, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

Figure 1:
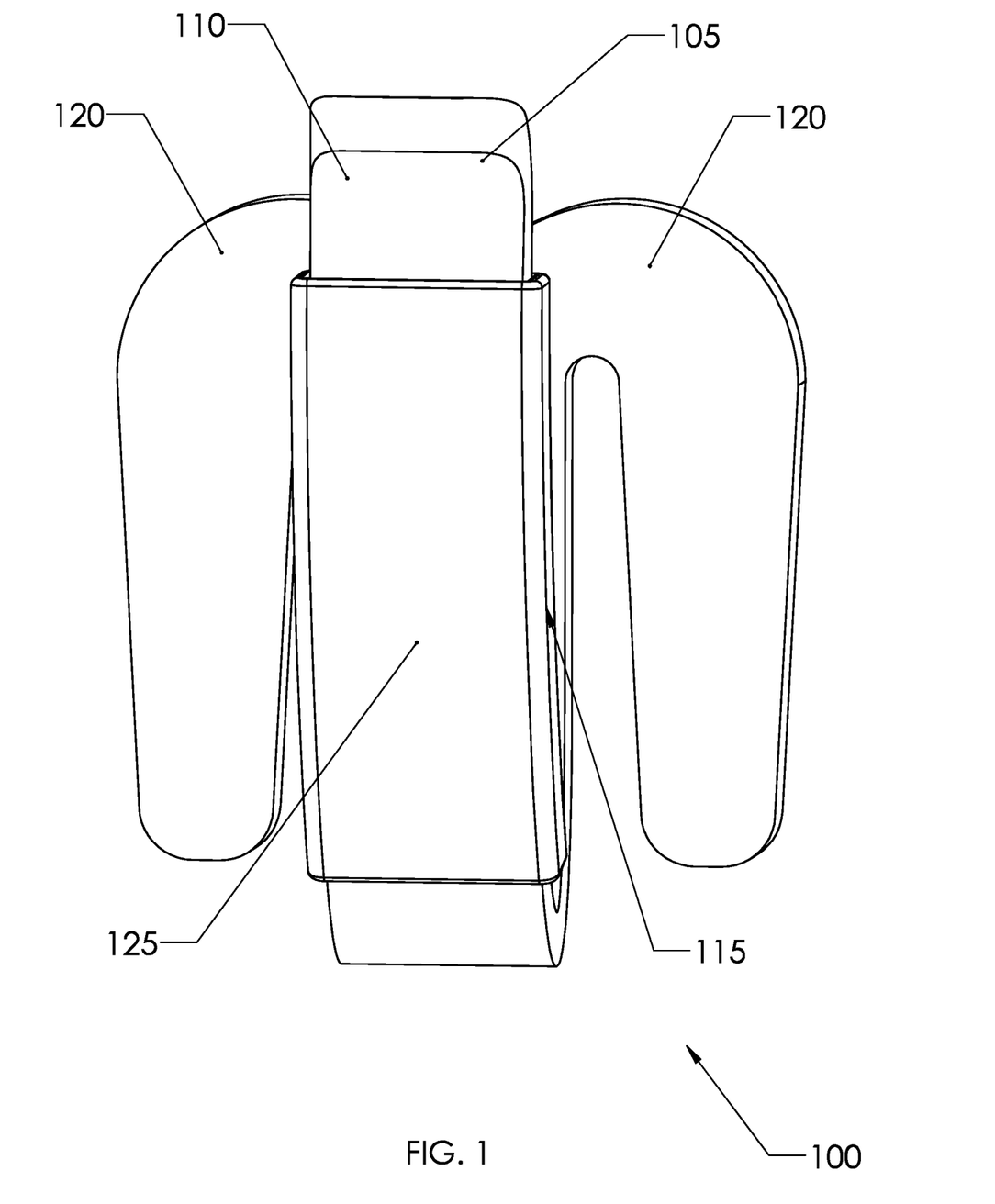
FIG. 1 is an exemplary front view of the eyeglasses clip/holder to secure a pair of eyeglasses to a hat/cap, according to an embodiment of the present invention.

FIG. 1 shows an embodiment of a front view of the eyeglasses clip/holder 100 to secure a pair of eyeglasses to a hat/cap. In the front view as depicted, a substantially flattened S-curved clamp is shown having an outward curving short upper end 105. The visible edges 110 of the eyeglasses clip/holder 100 are curved. The center portion 115 of the eyeglasses clip/holder 100 S-curve at the opposing end of the outward curving short upper end 105 curves sharply back upon itself 180° to extend back up roughly parallel to the center portion 115. Although not clearly shown, the back of the eyeglasses clip/holder 100 includes two wing retention prongs 120 extending outward to the side from the top of the vertical back to curve downward toward the 180° sharp curve. A center cushion 125 is fitted over the center portion 115 taking the form of a flattened cylinder slid over the center portion 115. The eyeglasses clip/holder 100 can be constructed from resilient plastic or other polymers. In some embodiments, the center cushion 125 can be omitted. Typically, a resilient soft plastic central portion 115 does not require a cushion.

Figure 2:
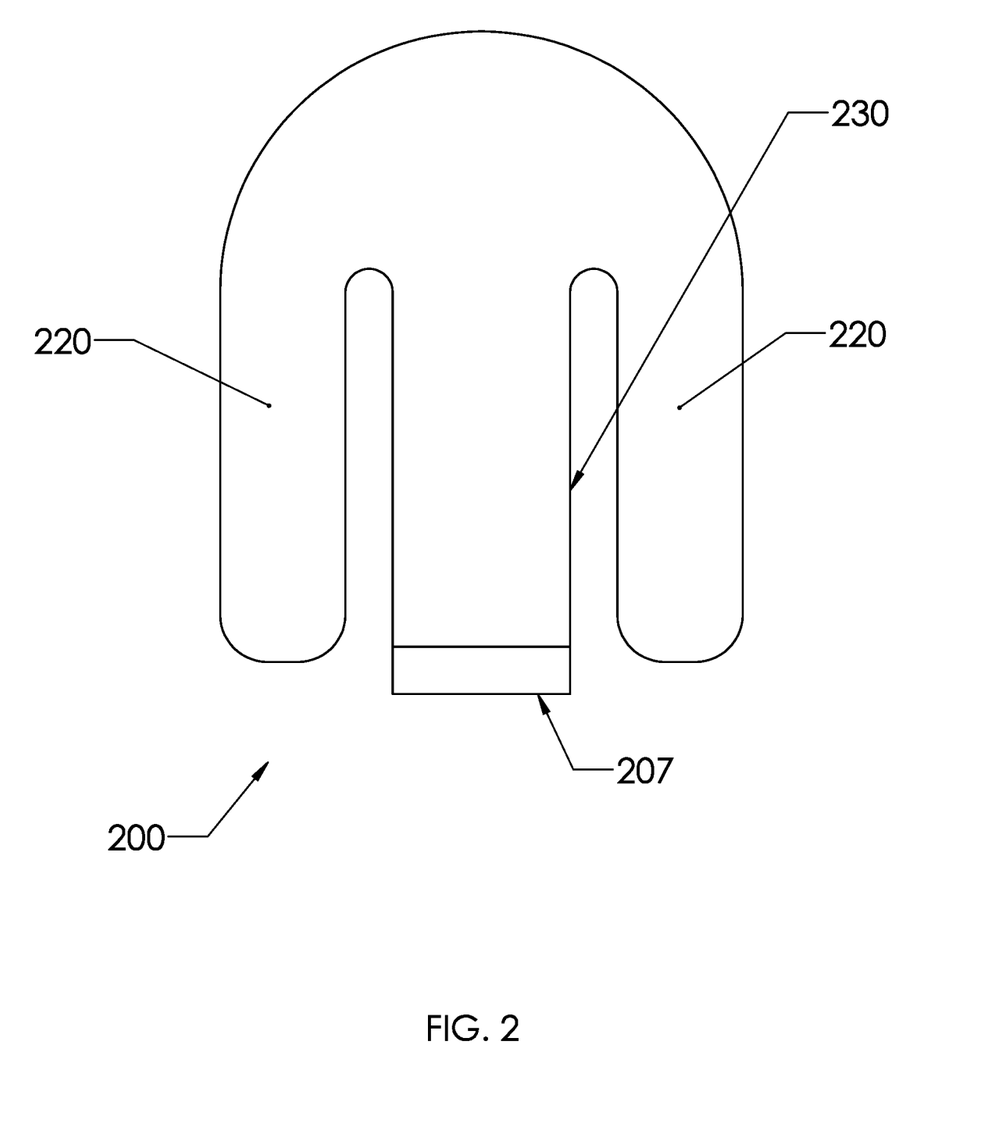
FIG. 2 is an exemplary back view of the eyeglasses clip/holder to secure a pair of eyeglasses to a hat/cap, according to an embodiment of the present invention.

FIG. 2 shows an embodiment of a back view of the eyeglasses clip/holder 200 to secure a pair of eyeglasses to a hat/cap. The back view depicts a vertical back clamp 230 extending upward from the bend 207 of the S-curved clamp. The upper end of the vertical back 205 (i.e., center portion) expands laterally to divide into two wing retention prongs 220 that fit behind a hat band while the vertical back 205 fits in front of the hat band. The two wing retention prongs 220 extend downward as depicted.

Figure 3:
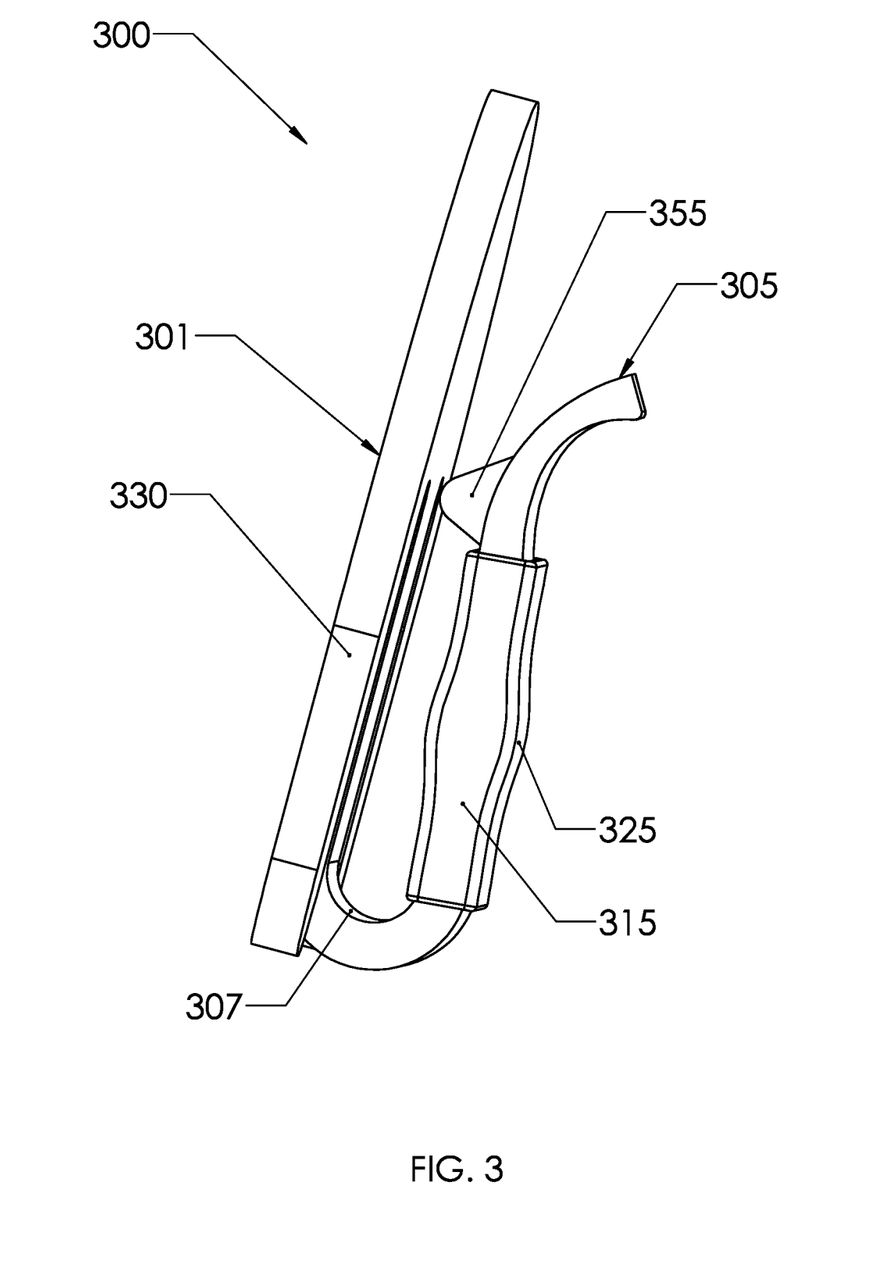
FIG. 3 is an exemplary side view of the eyeglasses clip/holder to secure a pair of eyeglasses to a hat/cap, according to an embodiment of the present invention.

FIG. 3 depicts an embodiment of a side view 300 of the eyeglasses clip/holder to secure a pair of eyeglasses to a hat/cap, showing the basic S-curved clamp 301. From the front end of the outward curving short upper end 305, the short curving upper end 305 transitions into an essentially straight central portion 315 (it can exhibit a slight curve as depicted) till it reaches the lower sharp curve 307 curving roughly 180° into a straight vertical back clamp 330. A cushion 325 surrounds the central portion 315, while a retention lip 355 extends from the back surface of the essentially straight central portion 315 to engage and secure the earpieces of a pair of eyeglasses inside the clip/holder 300. In some embodiments, the cushion 325 can be omitted. Typically, a resilient soft plastic central portion 315 does not require a cushion.

Figure 4:
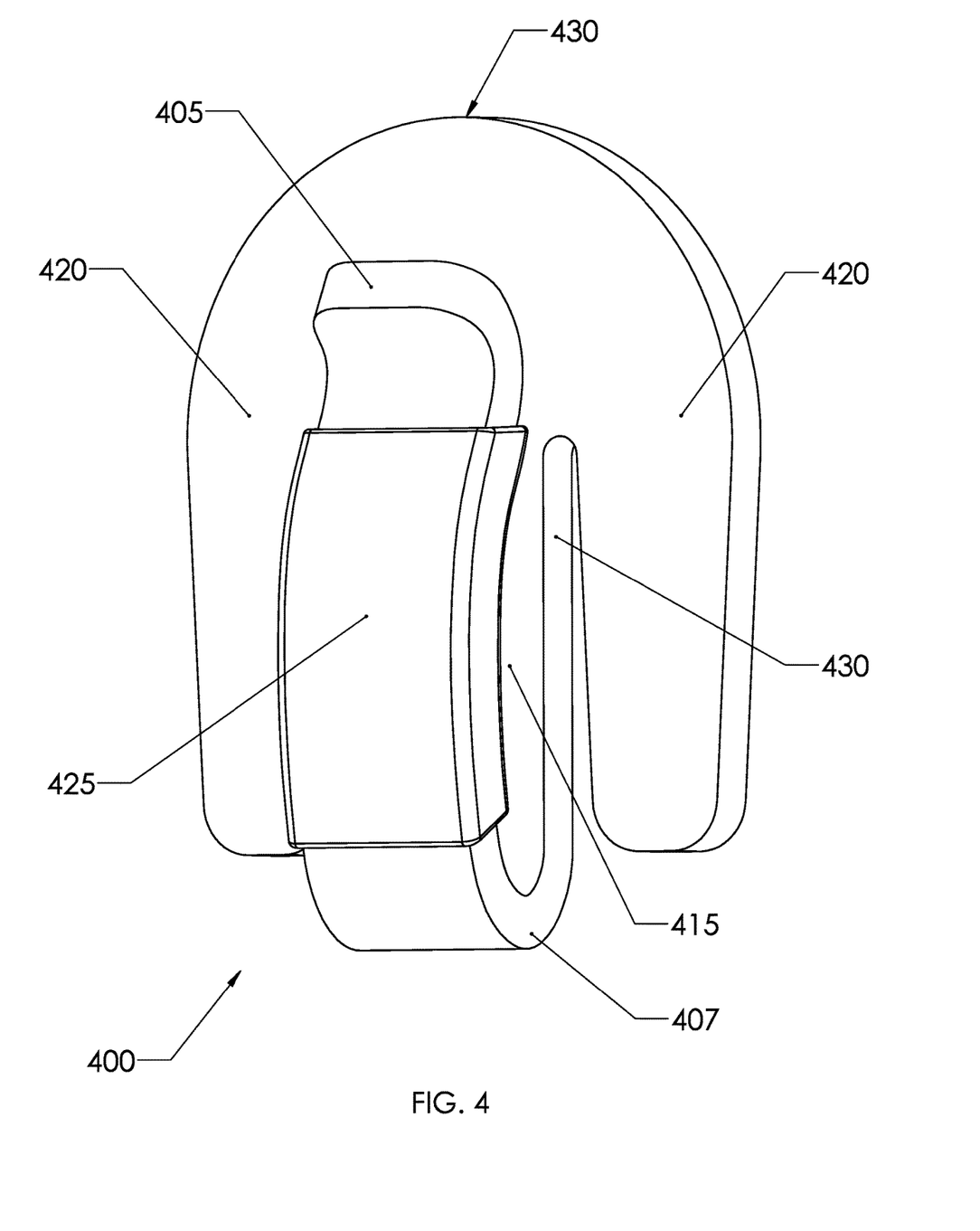
FIG. 4 is an exemplary ¾ side view of the eyeglasses clip/holder to secure a pair of eyeglasses to a hat/cap, according to an embodiment of the present invention.

FIG. 4 depicts an exemplary ¾ side view of the eyeglasses clip/holder to secure a pair of eyeglasses to a hat/cap. The eyeglasses clip/holder body 400 includes the roughly S-curved central portion 405. A curving short upper end 405 transitions into a roughly straight central portion 415 covered by a cushioning flattened cylinder 425. The roughly S-curved straight central portion 415 transitions into a sharp curve 407 through 180° into a straight vertical back clamp 430. The vertical back clamp 430 expands laterally with two wing retention prongs 420 that extend outward and curve down vertically back toward the 180° sharp curve 407. In some embodiments, the cushioning flattened cylinder 425 can be omitted. Typically, a resilient soft plastic central portion 415 does not require a cushion.

Figure 5:
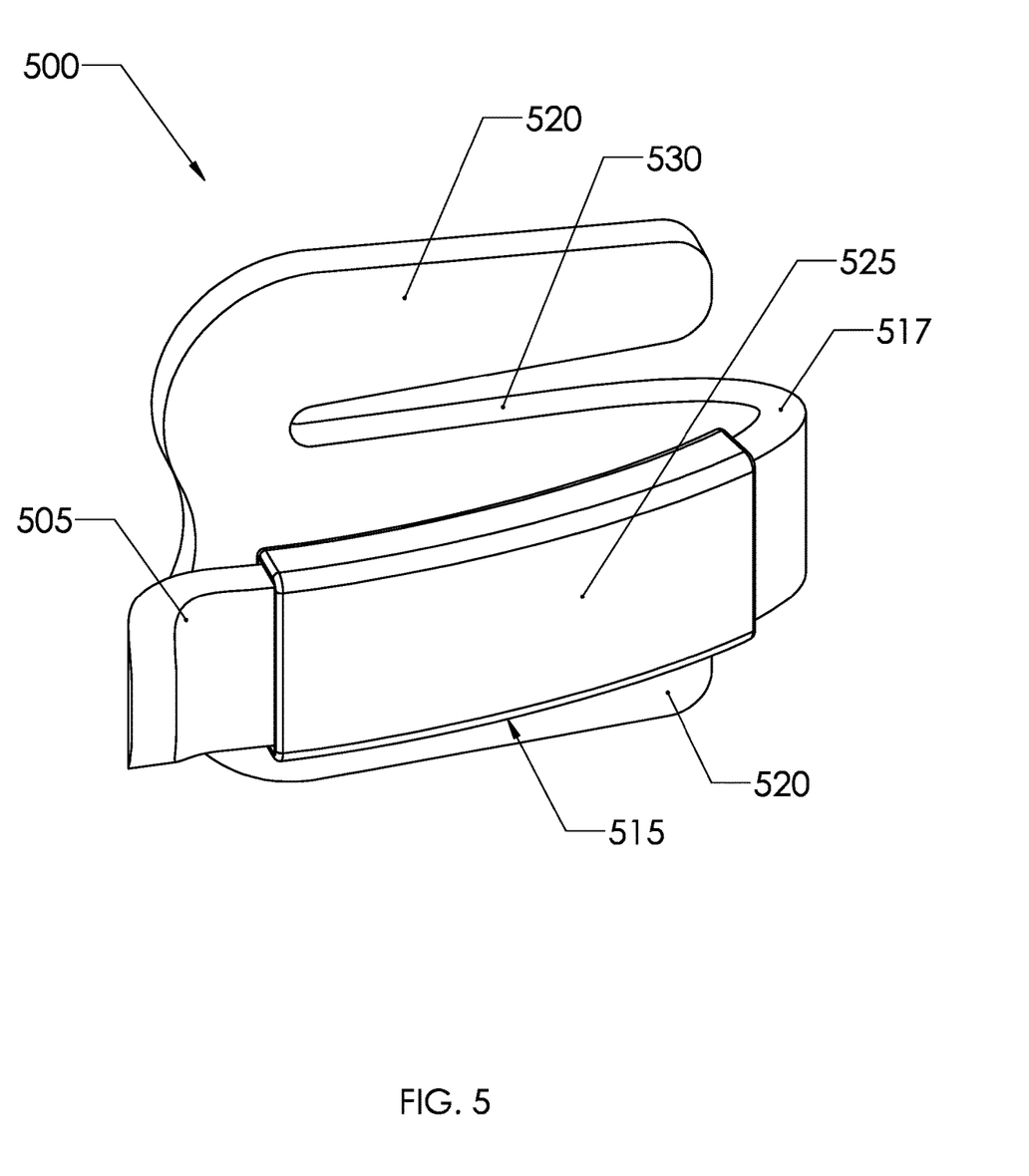
FIG. 5 is an exemplary second ¾ side view of the eyeglasses clip/holder to secure a pair of eyeglasses to a hat/cap in an upright configuration, according to an embodiment of the present invention.

FIG. 5 depicts a second exemplary ¾ side view of the eyeglasses clip/holder to secure a pair of eyeglasses to a hat/cap. The eyeglasses clip/holder body 500 includes the roughly S-curved straight central portion 515. A curving short upper end 505 transitions into a roughly straight central portion 515 covered by a cushioning flattened cylinder 525. The roughly S-curved central portion 505 transitions into a sharp curve 507 substantially through 180° to transition into a straight vertical back clamp 530. The vertical back clamp 530 expands laterally into two wing retention prongs 520 that curve outward and vertically back toward sharp curve 507. In some embodiments, the cushioning flattened cylinder 525 can be omitted. Typically, a resilient soft plastic central portion 515 does not require a cushion.

Figure 6:
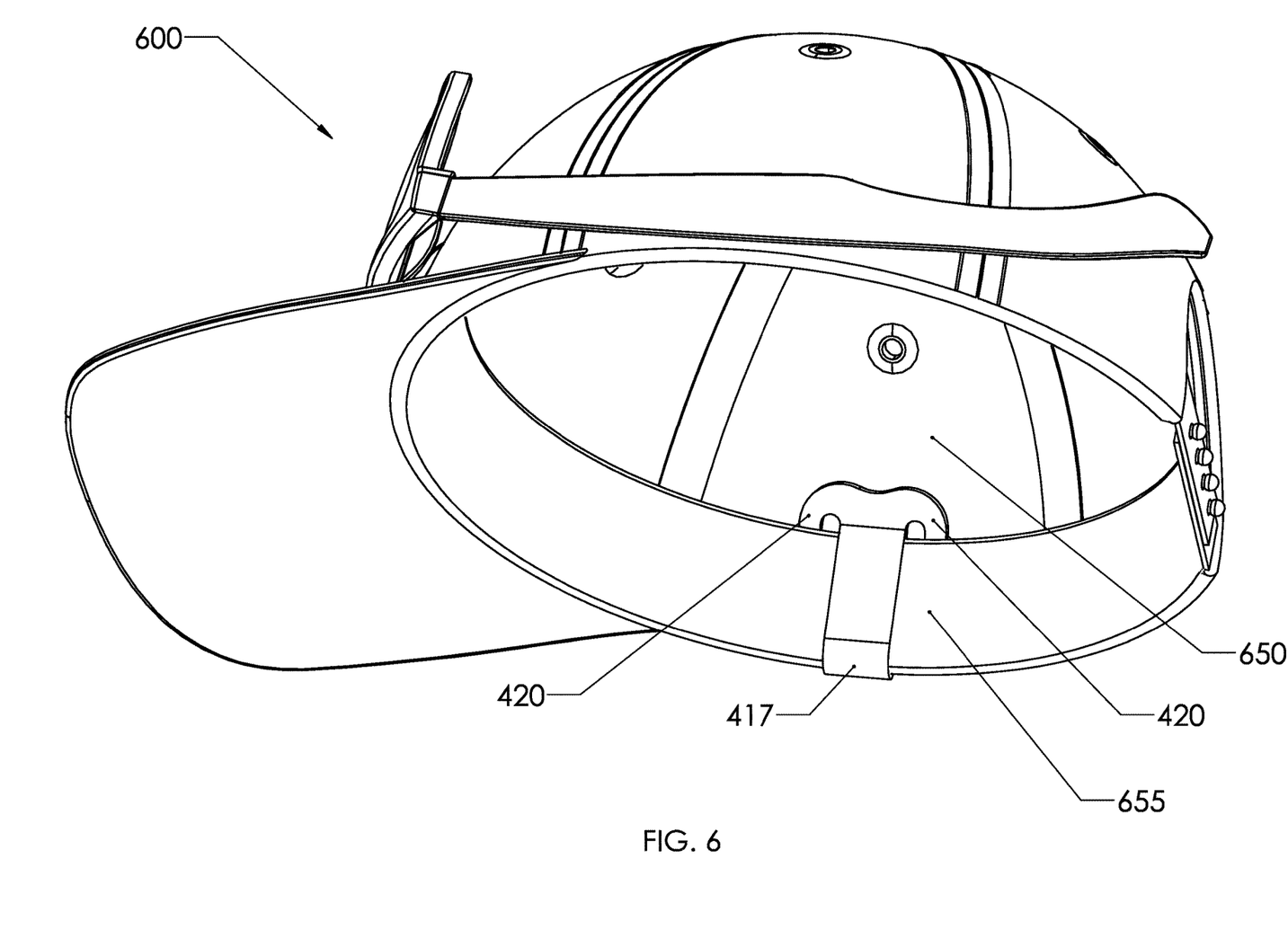
FIG. 6 is an exemplary view of the eyeglasses clip/holder inserted into the inner brim behind the hat band, according to an embodiment of the present invention.

FIG. 6 is an exemplary view of the eyeglasses clip/holder inserted into the inner brim behind the cap 600. Hat crown 650 has a circular opening with a hat band 655 forming a rim. Referring to the element labeling in FIG. 4, the straight vertical back clamp 430 fits over the front of hat band 655, while the wing retention prongs 420 fit behind the hat brim 555 forming an opposed clamp. The resulting clamping retention forces created by the offset planes of the front clamp 425 and prongs 420 firmly grasps the hat brim 655 and stabilize the positioning of the eyeglasses clip/holder body 400.

Figure 7:
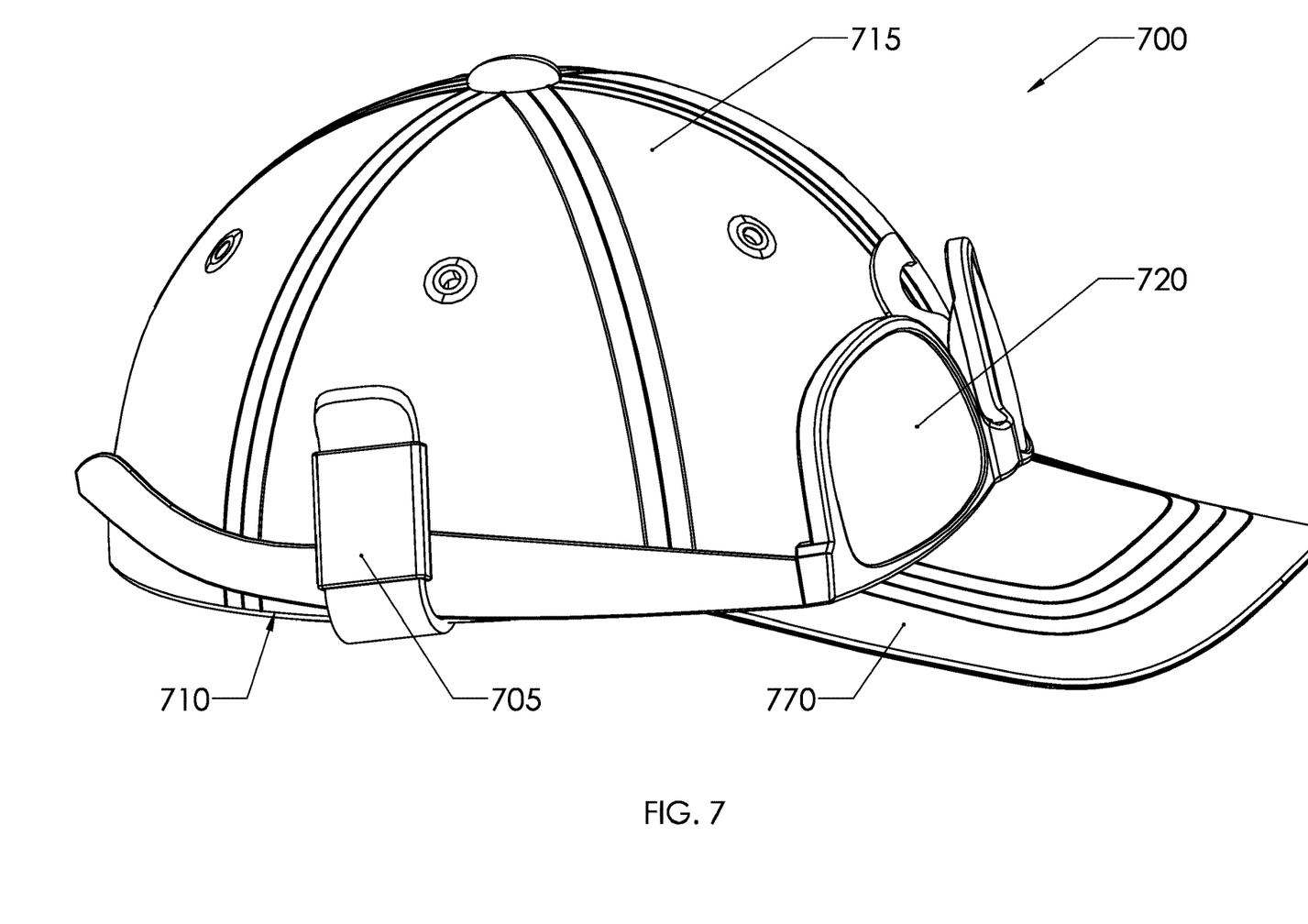
FIG. 7 is an exemplary view of the eyeglasses clip/holder attached to a hat/cap with a pair of eyeglasses retained facing forward and inverted, according to an embodiment of the present invention.

FIG. 7 depicts a pair of eyeglasses inserted into the clip/holder and retained in an inverted forward orientation. Eyeglasses clip/holder 705 is attached to the rim 710 at the sides of baseball cap 715. Sunglasses 720 are positioned above the brim 770 inverted with the earpieces 722 of sunglasses 720 inserted into clip/holder 705.

Figure 8:
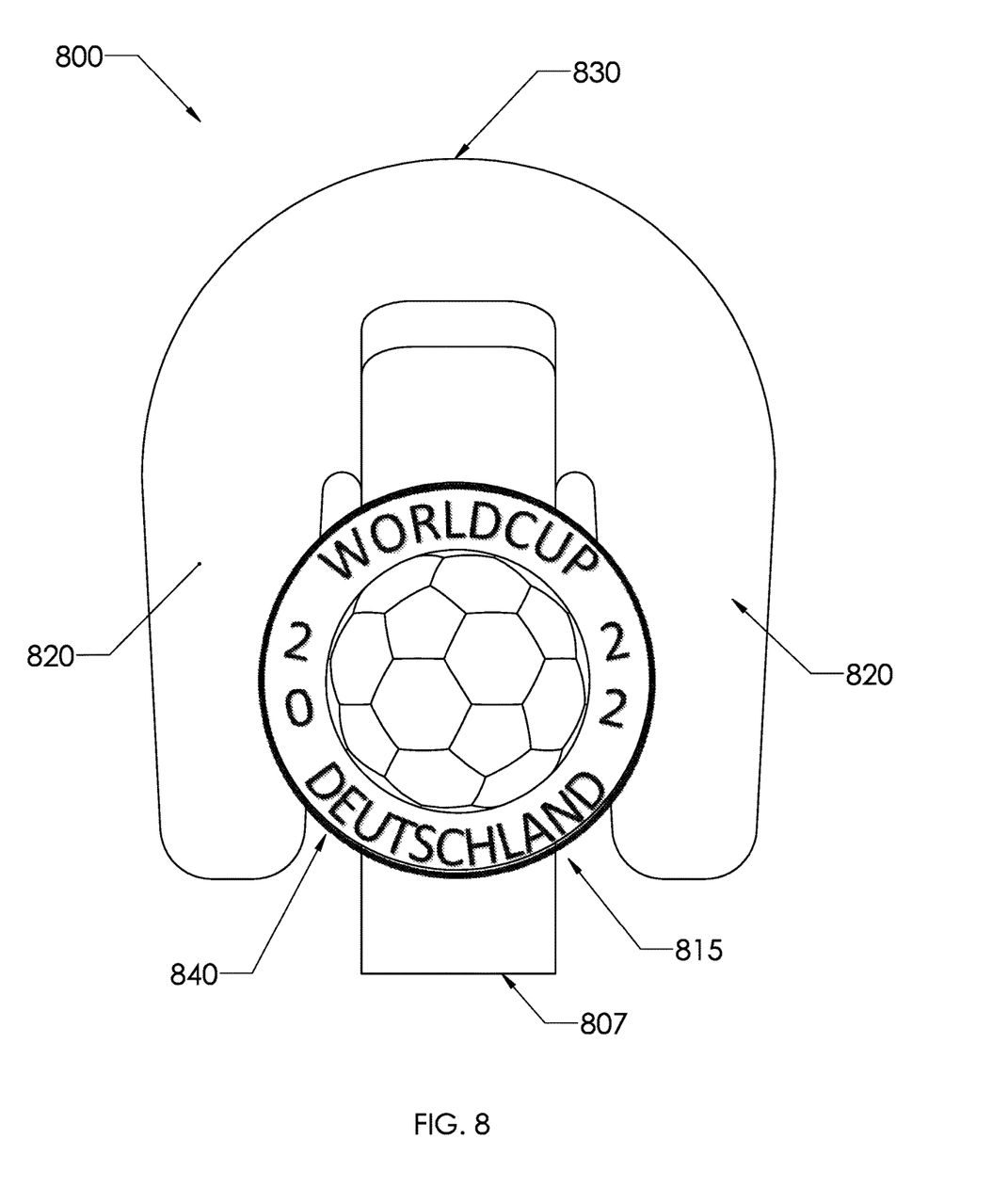
FIG. 8 depicts an exemplary front view of the eyeglasses clip/holder with an attached medallion or logo, according to an embodiment of the present invention.

FIG. 8 depicts a second exemplary ¾ side view of the eyeglasses clip/holder to secure a pair of eyeglasses to a hat/cap with an attached medallion or logo. The eyeglasses clip/holder body 800 includes the roughly S-curved straight central portion 815. Roughly straight central portion 815 curves upward from sharp curve 807 substantially through 180° into a vertical back clamp 830, which expands outward laterally into two wing retention prongs 820 that curve outward and vertically back toward sharp curve 807. A medallion or logo 840 can be attached to straight central portion 815. This medallion or logo 840 can further be molded into straight central portion 815, or straight central portion 815 can be modified so medallion or logo 840 is directly incorporated into the structure.

Figure 9:
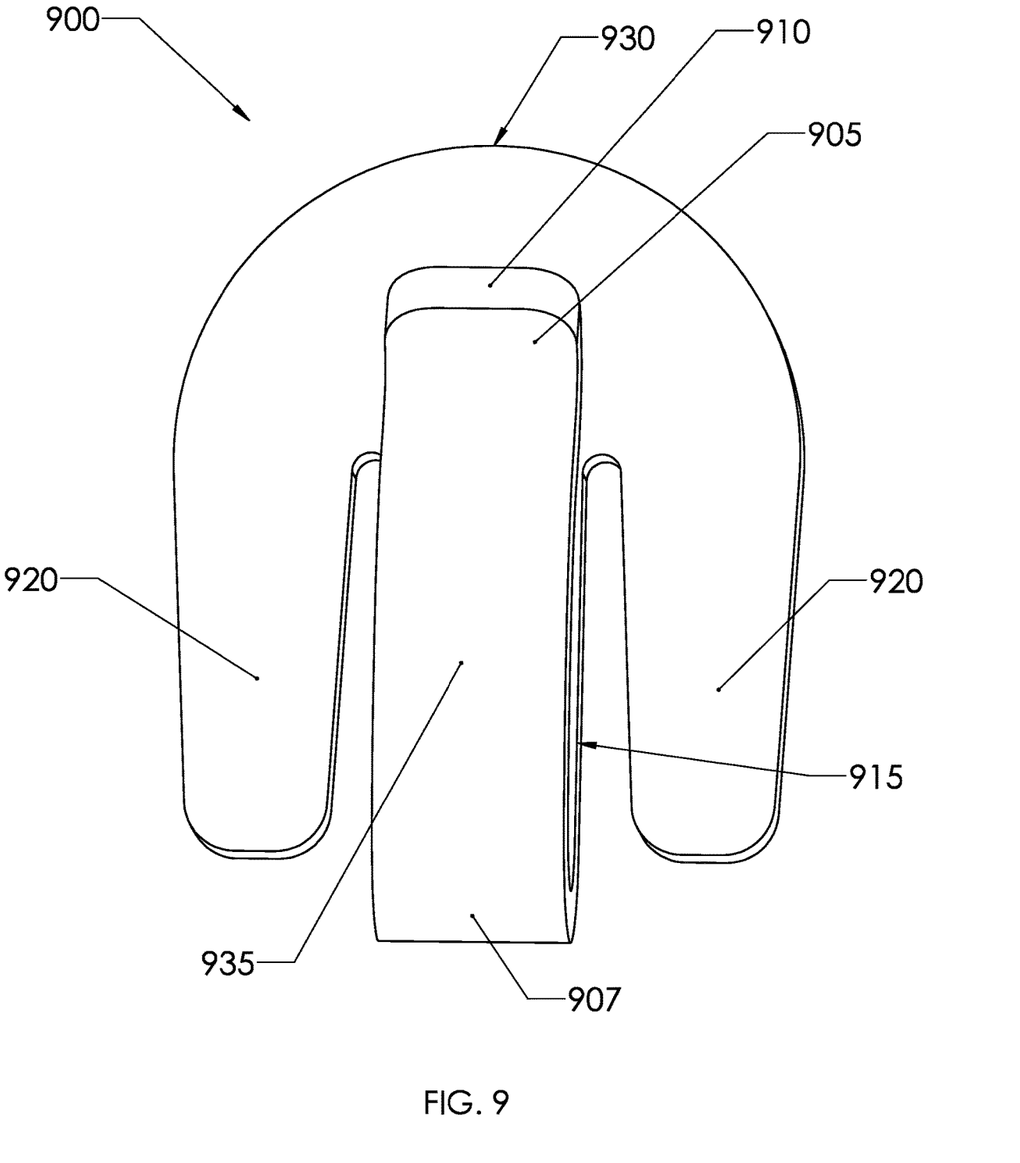
FIG. 9 depicts an exemplary front view of the eyeglasses clip/holder with an attached medallion or logo lacking the cushioning cylinder/sleeve, according to an embodiment of the present invention.

FIG. 9 depicts an embodiment of a front view of the eyeglasses clip/holder 900 to secure a pair of eyeglasses to a hat/cap lacking a cushioning cylinder or band. In the front view as depicted, a substantially flattened S-curved clamp is shown having an outward curving short upper end 905. The visible edges 910 of the eyeglasses clip/holder 900 curve slightly outward The center portion 915 of the eyeglasses clip/holder 900 S-curve at the opposing end of the outward curving short upper end 905 curves sharply back upon itself 180° to extend back up roughly parallel to the center portion 915. The straight central portion 915 extends upward from sharp curve 907 substantially through 180° into a vertical back clamp 930, which expands outward laterally into two wing retention prongs 920 that curve outward and vertically back toward sharp curve 907. Opposite of straight central portion 915, an exterior clamp 935 extends upward from sharp curve 907. The back of the eyeglasses clip/holder 900 includes two wing retention prongs 920 extending outward to the side from the top of the vertical back to curve downward toward the 180° sharp curve 907. The eyeglasses clip/holder 900 can be constructed from resilient plastic or other polymers.

Figure 10:
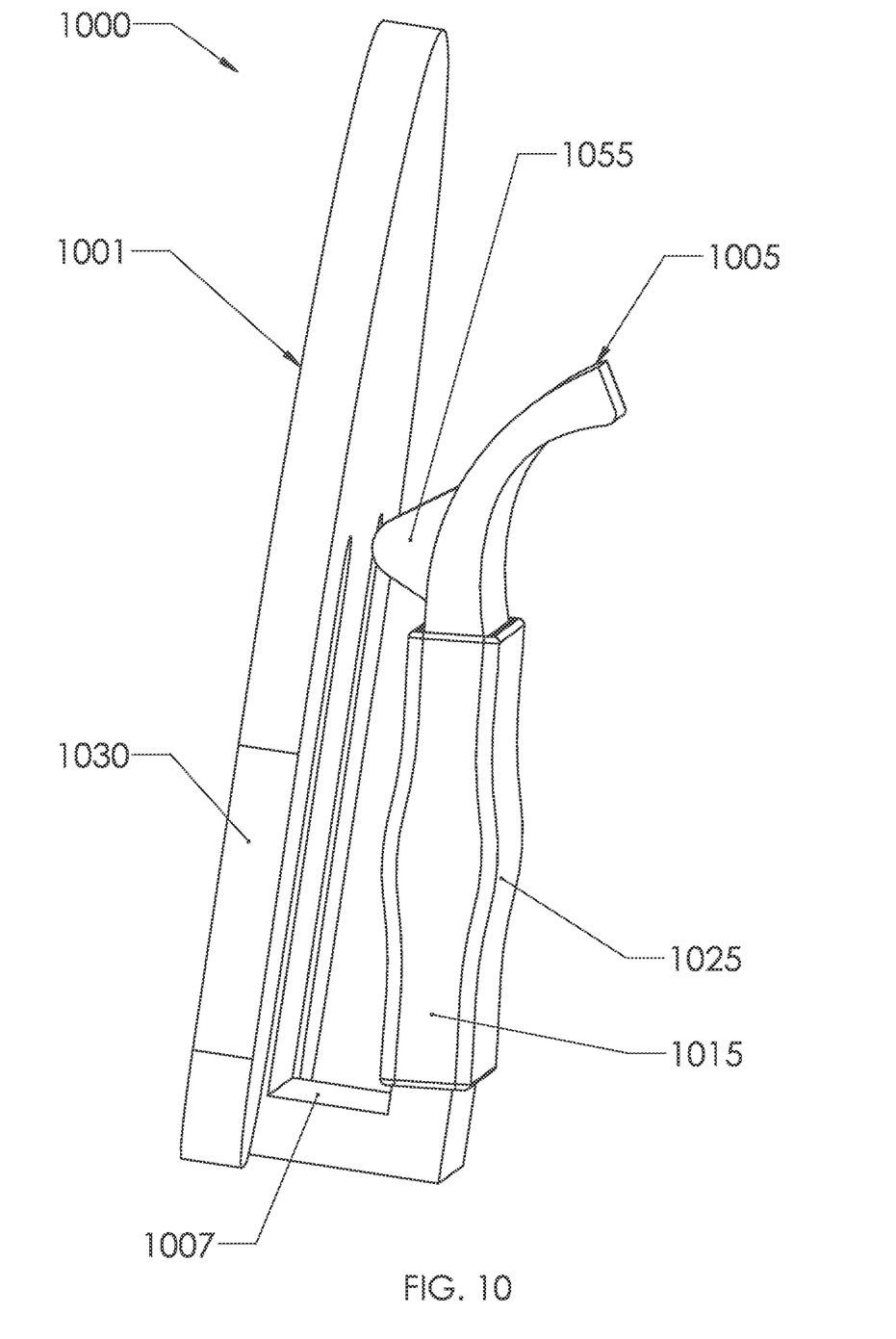
FIG. 10 is an exemplary side view of the eyeglasses clip/holder to secure a pair of eyeglasses to a hat/cap using a bridge-joint, according to an embodiment of the present invention.

FIG. 10 depicts an embodiment of a side view 1000 of the eyeglasses clip/holder to secure a pair of eyeglasses to a hat/cap, showing the basic S-curved clamp 1001. In this embodiment, a bridge-joint 1007 is utilized. From the front end of the outward curving short upper end 1005, the short curving upper end 1005 transitions into an essentially straight central portion 1015 (it can exhibit a slight curve as depicted) till it reaches the lower sharp curve 1007 curving roughly 180° into a straight vertical back clamp 1030. A cushion 1025 surrounds the central portion 1015, while a retention lip 1055 extends from the back surface of the essentially straight central portion 1015 to engage and secure the earpieces of a pair of eyeglasses inside the clip/holder 1000. In some embodiments, the cushion 1025 can be omitted. Typically, a resilient soft plastic central portion 1015 does not require a cushion.

Figure 11:
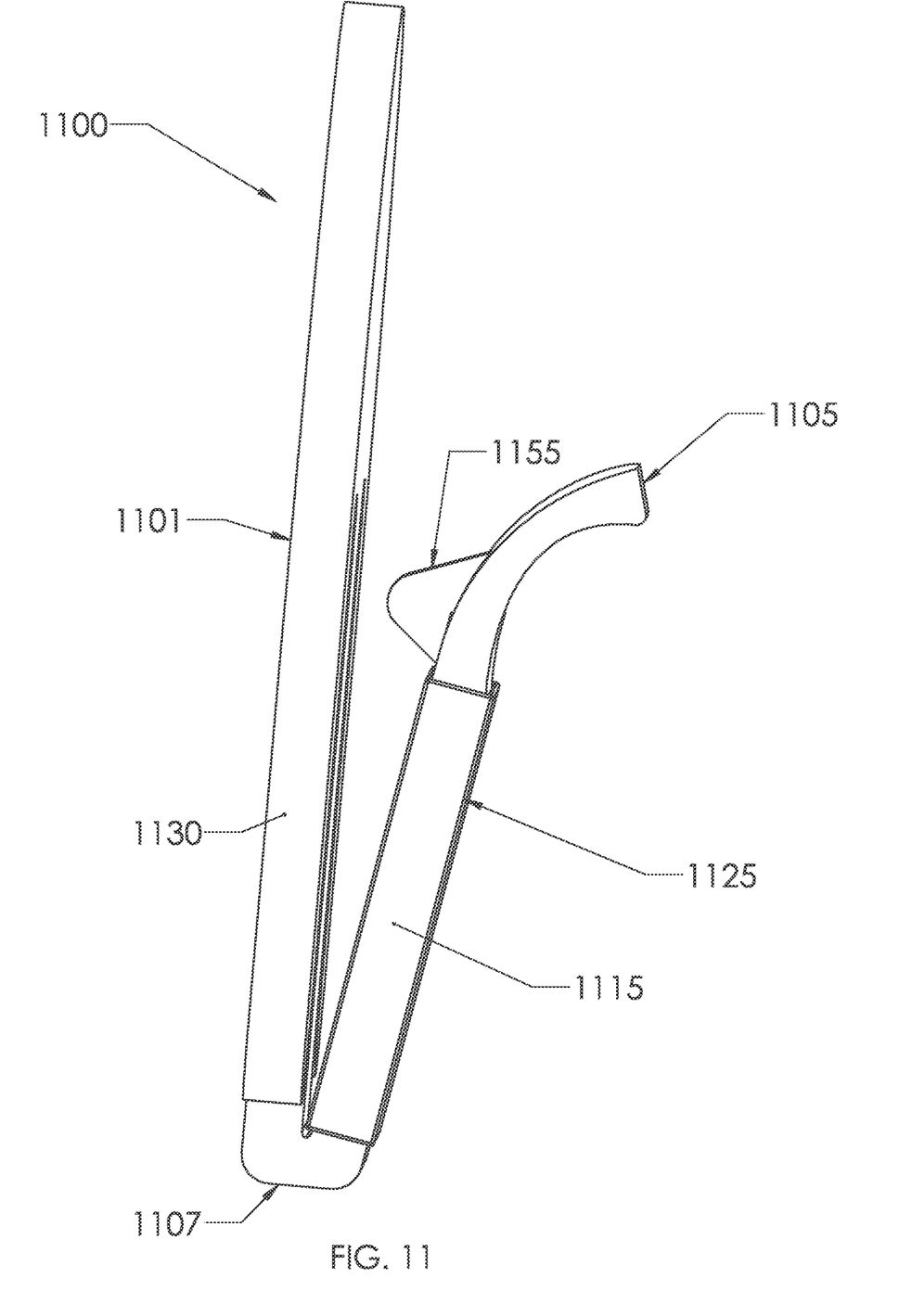
FIG. 11 is an exemplary side view of the eyeglasses clip/holder to secure a pair of eyeglasses to a hat/cap using a V-joint, according to an embodiment of the present invention.

FIG. 11 depicts an embodiment of a side view 1100 of the eyeglasses clip/holder to secure a pair of eyeglasses to a hat/cap, showing the basic S-curved clamp 1101. In this embodiment, a V-joint 1107 is utilized. From the front end of the outward curving short upper end 1105, the short curving upper end 1105 transitions into an essentially straight central portion 1115 (it can exhibit a slight curve as depicted) till it reaches the lower sharp curve 1107 curving roughly 180° into a straight vertical back clamp 1130. A cushion 1125 surrounds the central portion 1115, while a retention lip 1155 extends from the back surface of the essentially straight central portion 1115 to engage and secure the earpieces of a pair of eyeglasses inside the clip/holder 1100. In some embodiments, the cushion 1125 can be omitted. Typically, a resilient soft plastic central portion 1115 does not require a cushion.

Insofar as the description above and the accompanying drawing disclose any additional subject matter that is not within the scope of the single claim below, the inventions are not dedicated to the public and the right to the one or more applications to claim such additional inventions is reserved.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The foregoing has described methods and systems for a patient movement monitoring and feedback system that are given for illustration and not for limitation and uses. Thus, the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The eyeglasses holder/clip depicted can be vacuum molded plastic or printed on a 3D printer. It can also be formed from a single piece of sheet metal with the edges curved and smoothed out and the bent into position. It can also be coated with a plastic foam to provide a soft surface over the entire holder/clip. Likewise, the metal version can be coated with a soft plastic material or some other coating.

In an alternative embodiment, the clip/holder can be made from two parallel vertical members connected by a V-junction or a straight bridge, with a front member and a back member. The back member can broaden out at the top into two downward curving forks that double back toward the bottom to use to insert behind a hat band.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

I claim:

1. An eyeglasses holder device for securing a pair of eyeglasses, comprising:
   a resilient substantially flat eyeglasses holder body for attaching to a cap rim forming an opening into the cap;
   said eyeglasses holder including a substantially flattened and roughly S-curved body with an outer portion of the S-curve forming an essentially vertical straight central portion extending upward from a sharp substantially 180 degree curve that transitions into a roughly straight vertical back clamp extending upward roughly parallel to vertical central portion;
   said vertical back clamp extending laterally into two substantially straight wing retention prongs that extend to curve back toward the substantially 180 degree curve parallel with the vertical back clamp that terminate even with the 180 degree curve.

2. The eyeglasses holder device for securing a pair of eyeglasses of claim 1, further comprising:
   a short curved section positioned opposite from the 180 degree curve forming the top outward curve of the S-curved body to form an opening to receive the earpiece of a pair of eyeglasses.

3. The eyeglasses holder device for securing a pair of eyeglasses of claim 1, further comprising:
   a retention lip extending inward from the essentially vertical central section to engage an earpiece of an inserted pair of eyeglasses.

4. The eyeglasses holder device for securing a pair of eyeglasses of claim 1, wherein the vertical back clamp is positioned on the exterior of a hat band and the two wing retention prongs are inserted behind the exterior of the hat band opposite from the vertical back clamp to form an opposed clamp and create a clamping force.

5. The eyeglasses holder device for securing a pair of eyeglasses of claim 1, further comprising:
   a cushioning material forming a flattened cylinder slid over the essentially vertical straight central portion to surround the essentially vertical straight central portion.

6. The eyeglasses holder device for securing a pair of eyeglasses of claim 1, further comprising:
   a medallion on the vertical straight central portion.

7. An eyewear clipping device to fasten the eyewear to the sides of a cap, comprising:
   a first vertical member forming an exterior slot for receiving an earpiece of an eyewear with a first top end and a first bottom end;
   a second vertical member forming an interior three-sectioned clip with a second top end and a second bottom end comprising a central ascending vertical section that forks at the second top end to form two straight retention wing prongs that extend straight back downward parallel to the central ascending vertical section toward the second bottom end that insert behind a hat band of a cap and together with the central ascending vertical section, which is positioned in front of the hat band, create an opposed gripping force on the hat band;
   wherein the first bottom end and the second bottom end connect together and the two straight retention wing prongs terminate proximately and even with the first and second bottom end.

8. The eyewear clipping device to fasten the eyewear to the sides of a cap of claim 7, wherein the first bottom end and the second bottom end connect together using a bridge.

9. The eyewear clipping device to fasten the eyewear to the sides of a cap of claim 7, wherein the first bottom end and the second bottom end connect together forming a V-joint.

10. The eyewear clipping device to fasten the eyewear to the sides of a cap of claim 7, wherein the first bottom end and the second bottom end connect together at a sharp curve turning approximately 180 degrees, and further the first vertical member and the second vertical member comprise a one-piece roughly U-shape.

11. The eyewear clipping device to fasten the eyewear to the sides of a cap of claim 7, wherein the first top end comprises a short curve extending outward away from the second vertical member; and the first vertical member and the second vertical member comprise a one-piece roughly S-shape.

12. The eyewear clipping device to fasten the eyewear to the sides of a cap of claim 7, wherein the first vertical member further comprises a retention lip extending inward toward the second vertical member to retain the earpiece in place.

13. The eyewear clipping device to fasten the eyewear to the sides of a cap of claim 7, wherein the first vertical member further comprises a flattened cylinder of cushioning material surrounding the first vertical member.

14. The eyewear clipping device to fasten the eyewear to the sides of a cap of claim 7, wherein the first vertical member further comprises a medallion or logo.

15. An eyewear holder device to fasten the eyewear to a cap, comprising:
- a bottom joint comprised of a first essentially vertical member extending upward from the bottom joint forming an exterior slot for receiving an earpiece of an eyewear, which is positioned in front of a rim of a cap, and a second vertical member extending upward from the bottom joint forming an interior three-sectioned clip comprising a central ascending vertical section forking at a top end to form two straight retention wings that extend back downward as two straight prongs parallel to the ascending vertical section toward the joint to insert behind a hat band of a cap and together with the central ascending vertical section, which is positioned in front of the hat band, creating an opposed gripping force on the hat band;
- a retention lip extending inward from the first essentially vertical member to engage an earpiece of an inserted pair of eyeglasses;

wherein the bottom joint connects the first essentially vertical member and the second vertical member together and the two straight retention wings terminate proximately to and essentially even with the bottom joint.

16. The eyewear clipping device to fasten the eyewear to the sides of a cap of claim 15, wherein the joint comprises a bridge.

17. The eyewear clipping device to fasten the eyewear to the sides of a cap of claim 15, wherein the joint comprises a V-joint.

18. The eyewear clipping device to fasten the eyewear to the sides of a cap of claim 15, wherein the joint comprises a sharp curve turning approximately 180 degrees.

19. The eyewear clipping device to fasten the eyewear to the sides of a cap of claim 15, wherein the first essentially vertical member further comprises cushioning material.

20. The eyewear clipping device to fasten the eyewear to the sides of a cap of claim 15, wherein the first essentially vertical member further comprises a medallion or logo.

* * * * *